United States Patent
Bialer et al.

(10) Patent No.: US 12,306,333 B2
(45) Date of Patent: May 20, 2025

(54) RADAR SPECTRUM INTERPOLATION FOR VEHICLE NAVIGATION

(71) Applicant: GM GLOBAL TECHNOLOGY OPERATIONS LLC, Detroit, MI (US)

(72) Inventors: Oded Bialer, Petah Tivak (IL); Oren Longman, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 372 days.

(21) Appl. No.: 17/954,829

(22) Filed: Sep. 28, 2022

(65) Prior Publication Data
US 2024/0103127 A1    Mar. 28, 2024

(51) Int. Cl.
  *G01S 7/35*    (2006.01)
  *G01S 13/58*   (2006.01)
  *G01S 13/931*  (2020.01)

(52) U.S. Cl.
  CPC ............ G01S 7/354 (2013.01); G01S 13/931 (2013.01); *G01S 13/584* (2013.01)

(58) Field of Classification Search
  CPC combination set(s) only.
  See application file for complete search history.

(56) References Cited

U.S. PATENT DOCUMENTS

2021/0132190 A1*  5/2021  Nishimura ............ G01S 7/4056
2022/0317283 A1* 10/2022  Estep ................... G06F 12/0813

* cited by examiner

*Primary Examiner* — Vladimir Magloire
*Assistant Examiner* — Eric K Hodac
(74) *Attorney, Agent, or Firm* — Quinn IP Law

(57) ABSTRACT

A system for interpolating wireless spectrum. The system may include an antenna system operable for transmitting wireless signals and responsively receiving reflected signals. The system may additionally include an interpolation controller configured for collecting a plurality of reflection radar spectrum samples from the reflected signals, identifying an interpolation point between two or more interpolation samples of the samples, calculating an interpolation weight for the each of the interpolation samples, and determining an interpolated spectrum at the interpolation point as a summation of a product of the interpolation weights and the interpolation samples.

20 Claims, 3 Drawing Sheets

RADAR SPECTRUM INTERPOLATION FOR VEHICLE NAVIGATION

INTRODUCTION

The present disclosure relates to radar, source localization, sensor array, and other systems dependent on interpolating reflected, wireless signals, such as but not necessarily limited to radar systems employed within a vehicle for use in navigation.

A radar system may include a plurality of antennas to transmit radar signals into a surrounding environment and responsively receive reflected signals as the transmitted signals reflect off of structures, animals, people, objects, and other entities. A radar controller may be included as part of the radar system to process the reflected signals for purposes of identifying characteristics of the reflecting objects, with the corresponding processing optionally being used to calculate range, angle, and/or speed (Doppler) of the reflecting objects. An ability of the radar system to accurately identify a location of the object may be dependent on a capability of the radar controller to precisely identify peaks within the reflected signals, particularly when a location of the object may be previously unknown or multiple objects may be influencing the reflected signals. Due to the complexity associated with differentiating between the objects causing the reflected signals, and other intricacies associated with signal processing, the radar controller may be tasked with implementing a peak detection process.

Some interpolation controllers, such as those incorporated for use with an advanced driving assistance system (ADAS), a trajectory planning system, and other navigation systems of a vehicle, may lack the processing resources, speed, etc. needed to process an entirety of the reflected signals, and/or the corresponding radar system may lack the capability to capture an entirety of the reflected signal. These interpolation controllers may instead perform peak detection by taking samples of the reflected signals and using those samples to estimate the peaks in a process commonly referred to as interpolation. The use of samples to interpolate the reflected signals can be advantageous in limiting the amount of processing needed to identify signal peaks, however, some methods for interpolation, such as linear, expand and filter, parabolic, cubic, polynomial, and spline methodologies may introduce artifacts. The artifacts can cause signal distortions that shift the signal peaks and correspondingly produce errors in the detection the range, angle, and speed (Doppler) of an object.

SUMMARY

One non-limiting aspect of the present disclosure relates to an interpolation controller for increasing a resolution of complex signals, such as for reflected radar signals with linear phase and in a manner having minimal peak shift and accurate object detection.

One non-limiting aspect of the present disclosure relates to a system for interpolating radar spectrum for an advanced driving assistance system (ADAS) of a vehicle. The system may include a radar system operable with the ADAS to facilitate detecting objects in an environment surrounding the vehicle, optionally with the radar system including a plurality of antennas configured for transmitting radar signals into the environment and responsively receiving reflected signals. The system may further include an interpolation controller configured for collecting a plurality of reflection radar spectrum samples from the reflected signals, selecting an interpolation point between two or more interpolation samples of the reflection radar spectrum samples, calculating an interpolation weight for the each of the interpolation samples, and determining an interpolated radar spectrum at the interpolation point as a summation of a product of the interpolation weights and the interpolation samples.

The interpolation controller may be configured to determine the interpolation weights as a combination of weight coefficients providing a minimum mean square error between the interpolated radar spectrum and an actual radar spectrum at the interpolation point.

The interpolation controller may be configured to determine the interpolation weights according to a weighting vector. The weighting vector may be represented as $w = \mathrm{argmin}_w \{|\hat{y}_{k+\Delta} - y_{k+\Delta}|\}$, where w is the weighting vector, $\hat{y}_{k+\Delta}$ is the interpolated radar spectrum, and $y_{k+\Delta}$ is the actual radar spectrum.

The interpolation controller may be configured to determine the interpolated radar spectrum according to a spectrum function. The spectrum function may be represented as $\hat{y}_{k+\Delta} = w^H y$, where $\hat{y}_{k+\Delta}$ is the interpolated radar spectrum, w is the weighting vector, and y represents the reflected signals, optionally with $$w = \begin{bmatrix} w_1 \\ w_2 \end{bmatrix}; \text{ and } y = \begin{bmatrix} y_1 \\ y_2 \end{bmatrix}$$

and wherein $w_1$ is a first weight of the interpolation weights, $w_2$ is a second weight of the interpolation weights, $y_1$ is a first sample of the two or more interpolation samples, and $y_2$ is a second sample of the two or more interpolation samples.

The interpolation controller may be configured to determine the interpolated radar spectrum according to a spectrum function. The spectrum function may be represented as $\hat{y}_{k+\Delta} = w_1 y_k = w_2 y_{k+1}$, where $\hat{y}_{k+\Delta}$ is the interpolated radar spectrum, $\hat{y}_{k+\Delta}$ is a first sample of the two or more interpolation samples, $y_{k+1}$ is a second sample of the two or more interpolation samples, $w_1$ is a first weight of the interpolation weights, and $w_2$ is a second weight of the interpolation weights.

The interpolation controller may be configured to select the interpolation point to correspond with an offset selected relative to the first and second samples, with the offset being represented as $\Delta$.

One aspect of the present disclosure relates to an interpolation controller for interpolating radar spectrum. The interpolation controller may include a plurality of non-transitory instructions stored on a computer readable storage media, with the non-transitory instructions being executable with a processor to cause the interpolation controller to: select a plurality of reflection radar spectrum samples from reflected signals detected with a radar system, the radar system including a plurality of antennas configured for transmitting radar signals and responsively detecting the reflected signals; select an interpolation point between two or more interpolation samples of the reflection radar spectrum samples; calculate an interpolation weight for each of the interpolation samples; and determine an interpolated radar spectrum at the interpolation point as a summation of a product of the interpolation weights and the interpolation samples.

The non-transitory instructions may be executable to cause the interpolation controller to determine the interpolation weights as a combination of weight coefficient providing a minimum mean square error between the interpolated radar spectrum and an actual radar spectrum at the interpolation point.

The non-transitory instructions are executable to cause the interpolation controller to determine the interpolation weights according to a weighting vector, with the weighting vector being represented as $w=\mathrm{argmin}_w\{\hat{y}_{k+\Delta}-y_{k+\Delta}|\}$ where w is the weighting vector, $\hat{y}_{k+\Delta}$ is the interpolated radar spectrum, and $y_{k+\Delta}$ is the actual radar spectrum.

The non-transitory instructions may be executable to cause the interpolation controller to determine the interpolated radar spectrum according to a spectrum function, the spectrum function being represented as $\hat{y}_{k+\Delta}=w^H y$ where $\hat{y}_{k+\Delta}$ is the interpolated radar spectrum, w is the weighting vector, and y represents the reflected signals, optionally with $$w = \begin{bmatrix} w_1 \\ w_2 \end{bmatrix} y = \begin{bmatrix} y_1 \\ y_2 \end{bmatrix},$$

and wherein $w_1$ is a first weight of the interpolation weights, $w_2$ is a second weight of the interpolation weights, $y_1$ is a first sample of the two or more interpolation samples, and $y_2$ is a second sample of the two or more interpolation samples.

The non-transitory instructions may be executable to cause the interpolation controller to determine the interpolated radar spectrum according to a spectrum function, with the spectrum function being represented as $\hat{y}_{k+\Delta}=w_1 y_k + w_2 y_{k+1}$ where $\hat{y}_{k+\Delta}$ is the interpolated radar spectrum, $y_k$ is a first sample of the two or more interpolation samples, $y_{k+1}$ is a second sample of the two or more interpolation samples, $w_1$ is a first weight of the interpolation weights, and $w_2$ is a second weight of the interpolation weights.

The non-transitory instructions may be executable to cause the interpolation controller to select the interpolation point to correspond with an offset selected relative to the first and second samples, with the offset being represented as $\Delta$.

One aspect of the present disclosure relates to a system for interpolating wireless spectrum. The system may include an antenna system operable for transmitting wireless signals and responsively receiving reflected signals, an interpolation controller configured for collecting a plurality of reflection radar spectrum samples from the reflected signals, selecting an interpolation point between two or more interpolation samples of the reflection radar spectrum samples, calculating an interpolation weight for the each of the interpolation samples, and determining an interpolated spectrum at the interpolation point as a summation of a product of the interpolation weights and the interpolation samples.

The interpolation controller may be configured to determine the interpolation weights as a combination of weight coefficient providing a minimum mean square error between the interpolated spectrum and an actual spectrum at the interpolation point.

The interpolation controller may be configured to determine the interpolation weights according to a weighting vector, with the weighting vector being represented as: $w=\mathrm{argmin}_w\{|\hat{y}_{k+\Delta}-y_{k+\Delta}|\}$ where w is the weighting vector, $\hat{y}_{k+\Delta}$ is the interpolated spectrum, and $y_{k+\Delta}$ is the actual spectrum.

The interpolation controller may be configured to determine the interpolated spectrum according to a spectrum function, with the spectrum function being represented as $\hat{y}_{k+\Delta}=w^H y$ where $\hat{y}_{k+\Delta}$ is the interpolated spectrum, w is the weighting vector, and y represents the reflected signals, optionally with $$w = \begin{bmatrix} w_1 \\ w_2 \end{bmatrix} \text{ and } y = \begin{bmatrix} y_1 \\ y_2 \end{bmatrix}$$

and wherein $w_1$ is a first weight of the interpolation weights, $w_2$ is a second weight of the interpolation weights, $y_1$ is a first sample of the two or more interpolation samples, and $y_2$ is a second sample of the two or more interpolation samples.

The interpolation controller may be configured to determine the interpolated spectrum according to a spectrum function, with the spectrum function being represented as $\hat{y}_{k+\Delta}=w_1 y_k + w_2 y_{k+1}$ where $\hat{y}_{k+\Delta}$ is the interpolated spectrum, $y_k$ is a first sample of the two or more interpolation samples, $y_{k+1}$ is a second sample of the two or more interpolation samples, $w_1$ is a first weight of the interpolation weights, and $w_2$ is a second weight of the interpolation weights The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
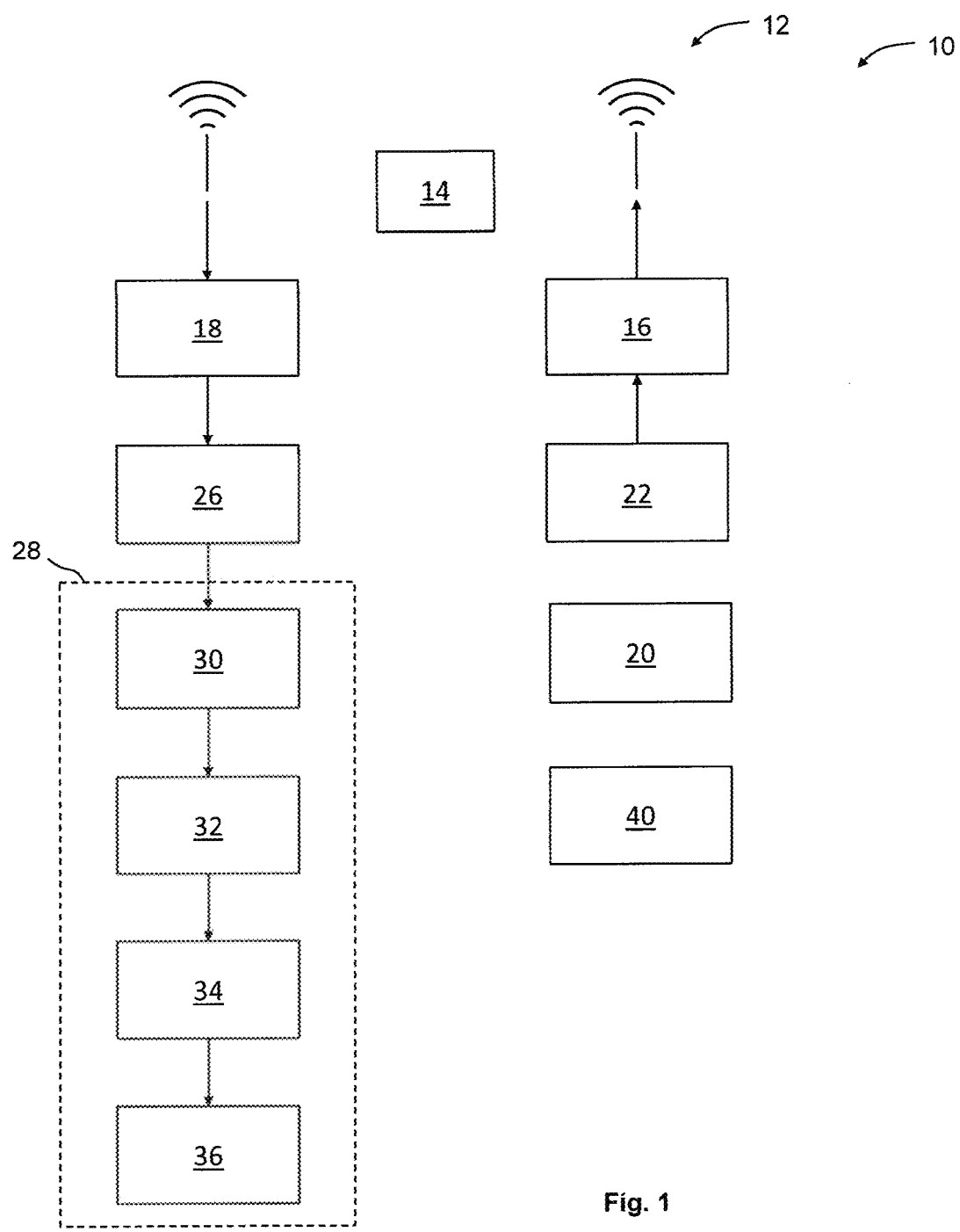
FIG. 1 schematically illustrates elements of a radar system in accordance with one non-limiting aspect of the present disclosure.

FIG. 1 schematically illustrates elements of a radar system 10 configured in accordance with one non-limiting aspect of the present disclosure. The radar system 10 may be configured to detect objects 14 and include an antenna array 12, which is shown for illustration purposes as including a transmitter 16 and a receiver 18 for respectively transmitting radar signals and receiving reflected radar signals, i.e., reflected signals. The radar system 10 is predominantly described with respect to assisting with navigation of a commercial vehicle, industrial vehicle, agricultural vehicle, passenger vehicle, aircraft, watercraft, train, all-terrain vehicle, personal movement apparatus, robot, automobile. The radar system 10, however, may also be employed for other purposes and/or with other types of devices and/or configurations, such as to facilitate source localization and sensor arrays. The radar system 10 is predominately described for exemplary and non-limiting purposes to demonstrate the capability of the present disclosure to improve operation of a vehicle (not shown) through the detection of the objects 14 in a vicinity of the vehicle.

The vehicle may be fully and/or partially autonomous and may correspondingly include a trajectory planning and/or an advanced driving assistance system (ADAS), as one skilled in the art would appreciate, capable of assisting the vehicle in automatically carrying passengers from one location to another. The autonomous control may correspond with Level Four or Level Five automation. The Level Four control may refer to driving mode-specific performance by an automated driving system of all aspects of the dynamic driving task, even if a human driver does not respond appropriately to a request to intervene. The Level Five may refer to the full-time performance by an automated driving system of all aspects of the dynamic driving task under all roadway and environmental conditions that can be managed by a human driver. The vehicle may correspondingly include an electrical power storage system, a propulsion system, a transmission system, a steering system, a brake system, a sensor system, etc., as one having ordinary skill in the art will appreciate. The propulsion system may include an internal combustion engine, an electric machine such as a traction motor, and/or a fuel cell propulsion system.

The radar system 10 may be considered as an on-vehicle construct operable to provide information related to location and trajectory of vehicles, pedestrians, and other objects 14 proximal thereto. A navigation system 20, for instance, may make use of information collected with the radar system 10 when informing the operator and/or when autonomously controlling the vehicle. The navigation system 20 may be capable of providing a level of driving automation such that the operator may be considered as the person responsible for directing operation of the vehicle, whether actively involved in controlling one or more vehicle functions or directing autonomous vehicle operation. Driving automation can include various dynamic driving and vehicle operations, including some level of automatic control or intervention related to a single vehicle function, such as steering, acceleration, and/or braking, with the operator continuously having overall control of the vehicle. Driving automation may include hardware and controllers configured to monitor the spatial environment under various driving modes to perform various driving tasks during dynamic operation.

Driving automation can include, by way of non-limiting examples, cruise control, adaptive cruise control, lane-change warning, intervention and control, automatic parking, acceleration, braking, and the like. The navigation system 20 may include one or a plurality of vehicle systems and associated controllers to assist in providing this level of driving automation. The vehicle systems, subsystems, and controllers associated with the navigation system 20 may be implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The navigation system 20 may include telematics and/or be an element of a wireless telematics communication that may be capable of extra-vehicle communication for communicating with a communication network system having wireless and wired communication capabilities. The extra-vehicle communication may include short-range vehicle-to-vehicle (V2V) communication and/or vehicle-to-everything (V2x) communication, which may include communication with an infrastructure monitor, e.g., a traffic camera, and communication to a proximal pedestrian, etc. Alternatively, or in addition, the navigation system 20 may be capable of short-range wireless communication to a handheld device, e.g., a cell phone, a satellite phone or another telephonic device. The handheld device may be loaded with a software application that includes a wireless protocol to communicate with the telematics system, and the handheld device executes the extra-vehicle communication for communicating with an off-board controller via a communication network, which may be in the form of a satellite, a cell tower antenna, and/or another mode of communication.

The navigation system 20 may include one or more sensing devices configured to sense observable conditions of the exterior environment and/or the interior environment of the vehicle. The sensing devices can include, but are not limited to, radars, lidars, global positioning systems, optical cameras, thermal cameras, ultrasonic sensors, and/or other sensors. The radar system 10 may send out an electromagnetic source pulse that may be reflected back to the vehicle by one or more objects 14 in the field of view. The source pulse may be a linear frequency modulated (LFM) pulse or "chirp" pulse suitable for determining range, Doppler and direction of arrival measurements of the one or more objects 14. The radar system 10 may further include circuitry for controlling operational parameters of the radar system 10 in order to increase resolution for a selected extent or region of the radar coverage or to increase the probability of detection and decrease the probability of false alarm (Pd/Pfa) within the region.

The radar system 10 may be configured as a multiple input/multiple output (MIMO) system that includes elements that may be configured to operate as a frequency-modulated continuous-wave radar (FM-CW) system. The radar signals may optionally be linear-frequency-modulated continuous-wave (LFM-CW) radar signals including a chirp-start portion such that each of the receivers includes a receiving antenna that is disposed to receive reflected radar signals. The radar system 10 may include a waveform generator 22 to generate a base waveform and provide the base waveform to the transmitter 16. The transmitter 16 may include circuitry for generating an electromagnetic source signal from the base waveform and provide the source signal to transmitter antenna (Tx) to propagate into the environment. The reflected signals, i.e., reflections of the source signal, may be received at receiver antenna (Rx) and produce a corresponding electrical signal at receiver 18.

The received signal may be sampled and converted to a digital signal at an analog-to-digital converter (ADC) 26. The sampled signal may then be provided to a digital processor 28 that detects targets while extracting their range, Doppler, and direction of arrival. The targets detection may be done on the Range-Doppler-Beam map which is generated by three processing blocks. First, range fast Fourier transform (FFT) 30 may be performed along every chirp to extract the range information and obtain Range-Chirp-Rx channel map. The Doppler FFT 32 may be performed along the chirp axis to extract the Doppler information and obtain Range-Doppler-Rx channel map, and lastly Digital Beamforming 34 may be performed along the Rx channel axis to extract the direction of arrival information and obtain the Range-Doppler-Beam map. The results after Digital Beamforming 34 may be provided to a detector 36 that detects targets and estimates the range, Doppler, azimuth, elevations (direction of arrival) and amplitude values for each target.

As part of the detector 36 or separately therefrom, the radar system 10 may include an interpolation controller 40 configured in accordance with the present disclosure for increasing a resolution of complex signals, such as reflected radar signals with linear phase, which has minimal peak shift and correspondingly provides accurate object detection. The interpolation controller 40 may include corresponding circuitry and may be in the form of a control module, module, control unit, processor, etc. and refer to one or various combinations of hardware, software, and/or logic. The interpolation controller 40 may include non-transitory memory component capable of storing machine/computer readable instructions in the form of one or more software or firmware programs or routines, combinational logic circuit(s), input/output circuit(s) and devices, signal conditioning and buffer circuitry and other components that can be accessed by one or more processors to provide the described functionality. Software, firmware, programs, instructions, control routines, code, algorithms, etc. may be performed with the controller according to execution of corresponding non-transitory instructions stored on an included computer readable storage medium.

Figure 2:
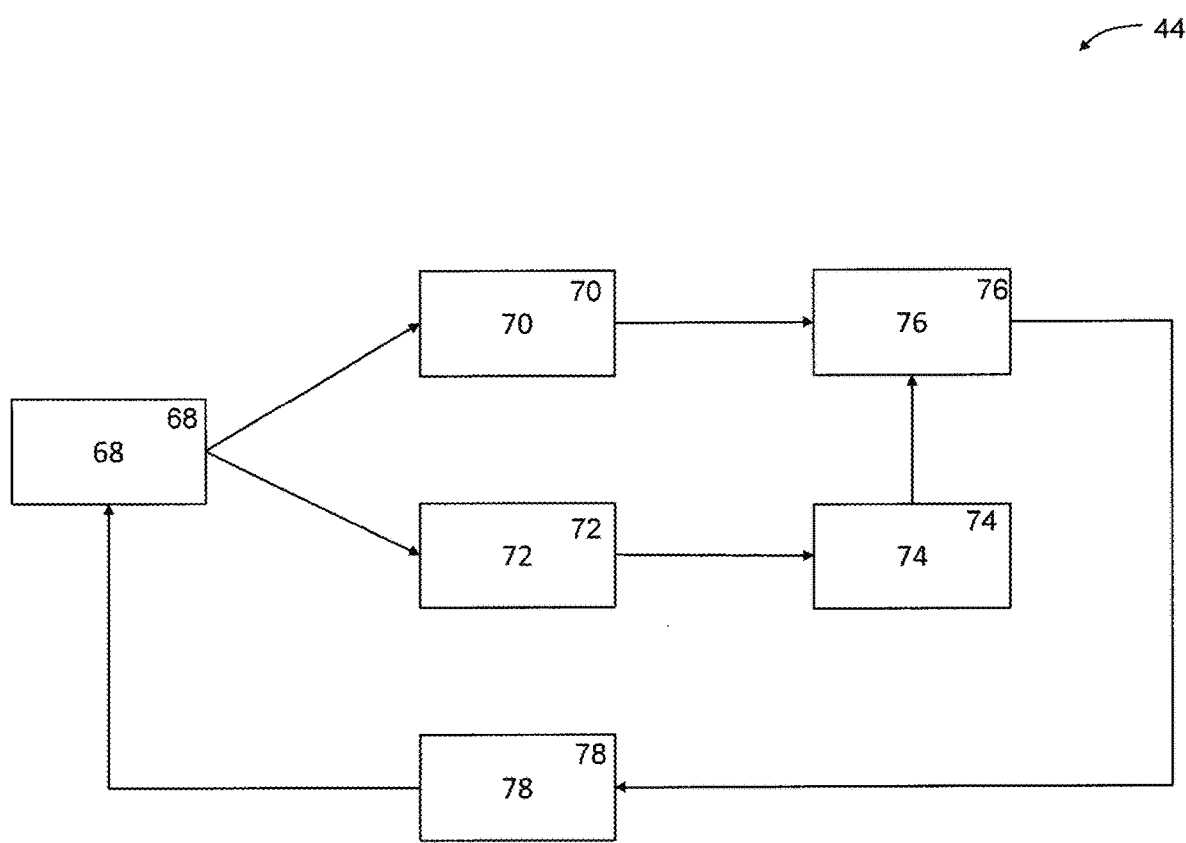
FIG. 2 illustrates a flowchart of a method for interpolating wireless spectrum in accordance with one non-limiting aspect of the present disclosure.
Figure 3:
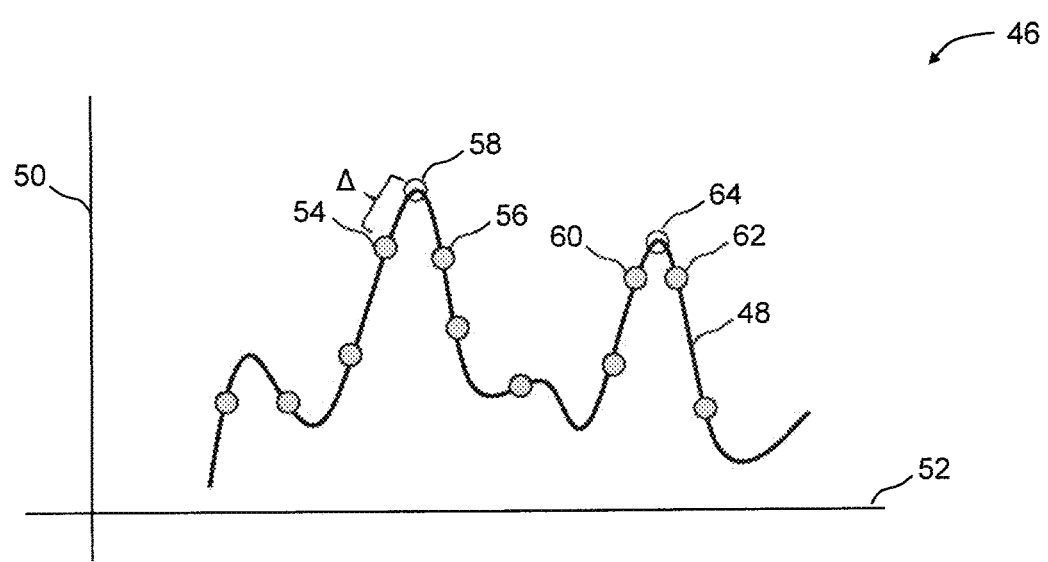
FIG. 3 illustrates a graph of a reflected signal in accordance with one non-limiting aspect of the present disclosure.

FIG. 2 illustrates a flowchart 44 of a method for interpolating wireless spectrum in accordance with one non-limiting aspect of the present disclosure. The method may be facilitated with the interpolation controller 40 or other assessing entity included within the vehicle supporting the operations contemplated herein. The method is predominantly described for exemplary purposes with respect to interpolating reflected signals generated with the radar system 10, such as in response to radar signals reflecting off of objects 14 in the vicinity of the vehicle. The present disclosure, nonetheless, fully contemplates its use and application in facilitating spectrum interpolation for other purposes. FIG. 3 illustrates a graph 46 of a reflected signal in accordance with one non-limiting aspect of the present disclosure. The reflected signal 46 may be comprised of an actual or true signal 48 reflected from one or more objects 14 that the interpolation controller 40 then samples, optionally based on or generated from performing a discrete Fourier transform (DFT) or other signal processing, to generate a plurality of reflection radar spectrum samples (shown as shaded circles). The reflection radar spectrum samples may be complex, reflected signals received at the receiver 18, with a vertical axis 50 corresponding with power and a horizontal axis 52 corresponding with range, angle, and/or Doppler.

The illustrated portion of the reflected signal 46 may correspond with a frame or other sampling interval of the radar system 10, which may be used to generate the illustrated plurality of discrete reflection radar spectrum samples. The discrete reflection radar spectrum samples may correspond with the portions of the reflected signal 46 being captured for further processing, which, for instance, may correspond with 512 samples per frame. An ability of the radar system 10 to accurately identify a location of the object(s) 14 producing the reflected signal 46 may be dependent on a capability of the interpolation controller 40 to precisely identify peaks therein. The interpolation controller 40 may perform a peak detection for determining the peaks by processing the reflection radar spectrum samples and correspondingly estimating the peaks. The radar system 10 may lack the capabilities to process an entirety of the reflected signal, and instead, utilize the reflection radar spectrum samples to identify the peaks by interpolating the reflected signal occurring between two or more of the reflection radar spectrum samples. In the illustrated example, this may correspond with the radar system 10 using first and second interpolation samples 54, 56 selected from the reflection radar samples on either side of a first peak 58 to interpolate the first peak 58 and using third and fourth interpolation samples 60, 62 selected from the reflection radar samples on either side of a second peak 64 to interpolate the second peak 64.

One non-limiting aspect of the present disclosure contemplates the radar system 10 determining the peaks by iteratively selecting offsets (Δ) between two or more of the interpolation samples and using those offsets to determine a corresponding interpolation point at which a corresponding interpolation of the reflection radar spectrum can be made. The offset may be repeatedly changed, and the process noted herein repeated for each change, including the interpolation points repeatedly shifted, until an interpolated representation of the reflection radar spectrum is detailed enough to identify the peaks. The dimension of y is the dimension of the spectrum samples used for the interpolated point, with the dimension of w being the same as the dimension of y, such that the more interpolation points used for the interpolation (i.e., the larger the dimension of y and w), the more accurate the interpolation will be, however, this comes with the price of complexity (i.e., more processing). The radar system 10, at least in this manner, may select multiple interpolation points between the samples such that these interpolations act as alias or representation of the actual reflected signal. Returning to FIG. 2, block 68 relates to selecting an interpolation point, i.e., a desired portion of the reflected signal to be interpolated based one or more of the reflection radar spectrum samples. Block 70 relates to identifying two or more interpolation samples adjacent to the interpolation point, e.g., selecting at least one sample on either side of the interpolation point or optionally an unequal number of samples on either side of the interpolation point. Block 72 relates to selecting an offset for the interpolation point. The offset may correspond with a desired location or portion of the reflected signal between the samples to be interpolated, e.g., if the desire is to interpolate at a location halfway between two samples, with one of the samples on either side of the interpolation point, the offset may be 0.5 on a normalized scale of 0-1, i.e., halfway therebetween, and if the desire is to be closer to one sample of another sampled the offset would be relatively increased or decreased therefrom, e.g., between 0-1. Block 74 relates to determining an interpolation weight for the each of the interpolation samples, which may be determined as a combination of weight coefficient providing a minimum mean square error. Block 76 relates to determining an interpolated radar spectrum at the interpolation point as a summation of a product of the interpolation weights and the interpolation samples. Block 78 relates to repeating the interpolation processing for additional interpolation points until the interpolation radar spectrum at those additional interpolation points is sufficient to accurately identify the peaks.

The interpolation weights may be determined according to a weighting vector, with the weighting vector being represented as:

$$w = \mathrm{argmin}_w \{|\hat{y}_{k+\Delta} - y_{k+\Delta}|\} \qquad \text{[equation 1]}$$

where w is the weighting vector, $\hat{y}_{k+\Delta}$ is the interpolated radar spectrum, which may be a linear function of w, and $y_{k+\Delta}$ is the actual radar spectrum. The weights w may be calculated per offset value Δ such that w vector may be calculated per offset and specific for interpolation at the desired interpolation point.

The interpolation weights may also be represented as:

$$w_\Delta = \qquad \text{[equation 2]}$$
$$(A^H A)^{-1} A^H a_\Delta \text{ where } a_\Delta = \left[ e^{j\frac{2\pi\Delta}{N}} \ e^{j\frac{2\pi\Delta}{N}2} \ e^{j\frac{2\pi\Delta}{N}3} \ ... \right]^T$$
$$\text{with } a_k = \left[ e^{j\frac{2\pi k}{N}} \ e^{j\frac{2\pi k}{N}2} \ e^{j\frac{2\pi k}{N}3} \ ... \right]^T; \text{ and} \qquad \text{[equation 3]}$$
$$A = [a_k a_{k+1}] \qquad \text{[equation 4]}$$

The interpolated radar spectrum may be determined according to a spectrum function, with the spectrum function being represented as:

$$\hat{y}_{k+\Delta} = w^H y \qquad \text{[equation 5]}$$

where $\hat{y}_{k+\Delta}$ is the interpolated radar spectrum, w is the weighting vector, and y represents the reflected signals.

The weighting vector may be represented as:

$$w = \begin{bmatrix} w_1 \\ w_2 \end{bmatrix} \qquad \text{[equation 6]}$$

where $w_1$ is a first weight of the interpolation weights, $w_2$ is a second weight of the interpolation weights.

The reflected signals may be represented as:

$$y = \begin{bmatrix} y_1 \\ y_2 \end{bmatrix} \qquad \text{[equation 7]}$$

where $y_1$ is a first sample of the two or more interpolation samples, and $y_2$ is a second sample of the two or more interpolation samples.

The interpolated radar spectrum may be determined according to an alternatively spectrum function, with the spectrum function being represented as:

$$\hat{y}_{k+\Delta} = w_1 y_k + w_2 y_{k+1} \qquad \text{[equation 8]}$$

where $\hat{y}_{k+\Delta}$ is the interpolated radar spectrum, $y_k$ is a first sample of the two or more interpolation samples, $y_{k+1}$ is a second sample of the two or more interpolation samples, $w_1$ is a first weight of the interpolation weights, and $w_2$ is a second weight of the interpolation weights.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for interpolating radar spectrum for an advanced driving assistance system (ADAS) of a vehicle, the system comprising:
   a radar system operable with the ADAS to facilitate detecting objects in an environment surrounding the vehicle, the radar system including a plurality of antennas configured for transmitting radar signals into the environment and responsively receiving reflected signals; and
   an interpolation controller configured for collecting a plurality of reflection radar spectrum samples from the reflected signals, selecting an interpolation point between two or more interpolation samples of the reflection radar spectrum samples, calculating an interpolation weight for the each of the interpolation samples as a combination of weight coefficients providing a minimum mean square error between an interpolated radar spectrum and an actual radar spectrum at the interpolation point, and determining the interpolated radar spectrum at the interpolation point as a summation of a product of the interpolation weights and the interpolation samples.

2. The system according to claim 1, wherein the interpolation controller is further configured to determine the interpolation weights according to a weighting vector, the weighting vector being represented as:

$$w = \text{argmin}_w \{ |\hat{y}_{k+\Delta} - y_{k+\Delta}| \},$$

where W is the weighting vector, $\hat{y}_{k+\Delta}$ is the interpolated radar spectrum, and $y_{k+\Delta}$ is the actual radar spectrum.

3. The system according to claim 2, wherein the interpolation controller is further configured to determine the interpolated radar spectrum according to a spectrum function, the spectrum function being represented as:

$$\hat{y}_{k+\Delta}=w^H y,$$

where $\hat{y}_{k+\Delta}$ is the interpolated radar spectrum, w is the weighting vector, and y represents the reflected signals.

4. The system according to claim 3, wherein:

$$w = \begin{bmatrix} w_1 \\ w_2 \end{bmatrix};$$

$$y = \begin{bmatrix} y_1 \\ y_2 \end{bmatrix};$$

and wherein $W_1$ is a first weight of the interpolation weights, $W_2$ is a second weight of the interpolation weights, $Y_1$ is a first sample of the two or more interpolation samples, and $y_2$ is a second sample of the two or more interpolation samples.

5. The system according to claim 2, wherein the interpolation controller is further configured to determine the interpolated radar spectrum according to a spectrum function, the spectrum function being represented as:

$$\hat{y}_{k+\Delta}=w_1 y_k + w_2 y_{k+1}$$

where $\hat{y}_{k+\Delta}$ is the interpolated radar spectrum, $y_k$ is a first sample of the two or more interpolation samples, $y_{k+1}$ is a second sample of the two or more interpolation samples, $W_1$ is a first weight of the interpolation weights, and $W_2$ is a second weight of the interpolation weights.

6. The system according to claim 5, wherein the interpolation controller is further configured to select the interpolation point to correspond with an offset selected relative to the first and second samples, the offset being represented as $\Delta$.

7. The system according to claim 1, wherein the radar system and the interpolation controller are disposed in the vehicle.

8. An interpolation controller for interpolating radar spectrum, the interpolation controller including a plurality of non-transitory instructions stored on a computer readable storage media, the non-transitory instructions being executable with a processor to cause the interpolation controller to:
select a plurality of reflection radar spectrum samples from reflected signals detected with a radar system, the radar system including a plurality of antennas configured for transmitting radar signals and responsively detecting the reflected signals;
select an interpolation point between two or more interpolation samples of the reflection radar spectrum samples;
calculate an interpolation weight for each of the interpolation samples as a combination of weight coefficient providing a minimum mean square error between an interpolated radar spectrum and an actual radar spectrum at the interpolation point; and
determine the interpolated radar spectrum at the interpolation point as a summation of a product of the interpolation weights and the interpolation samples.

9. The interpolation controller according to claim 8, wherein the non-transitory instructions are further executable to cause the interpolation controller to determine the interpolation weights according to a weighting vector, the weighting vector being represented as:

$$w = \operatorname{argmin}_w \{|\hat{y}_{k+\Delta} - y_{k+\Delta}|\},$$

where W is the weighting vector, $\hat{y}_{k+\Delta}$ is the interpolated radar spectrum, and $y_{k+\Delta}$ is the actual radar spectrum.

10. The interpolation controller according to claim 9, wherein the non-transitory instructions are further executable to cause the interpolation controller to determine the interpolated radar spectrum according to a spectrum function, the spectrum function being represented as:

$$\hat{y}_{k+\Delta}=W^H y,$$

where $\hat{y}_{k+\Delta}$ is the interpolated radar spectrum, W is the weighting vector, and y represents the reflected signals.

11. The interpolation controller according to claim 10, wherein:

$$w = \begin{bmatrix} w_1 \\ w_2 \end{bmatrix};$$

$$y = \begin{bmatrix} y_1 \\ y_2 \end{bmatrix};$$

and wherein $W_1$ is a first weight of the interpolation weights, $W_2$ is a second weight of the interpolation weights, $Y_1$ is a first sample of the two or more interpolation samples, and $Y_2$ is a second sample of the two or more interpolation samples.

12. The interpolation controller according to claim 9, wherein the non-transitory instructions are further executable to cause the interpolation controller to determine the interpolated radar spectrum according to a spectrum function, the spectrum function being represented as:

$$\hat{y}_{k+\Delta}=W_1 Y_k + W_2 Y_{k+1},$$

where $\hat{y}_{k+\Delta}$ is the interpolated radar spectrum, $Y_k$ is a first sample of the two or more interpolation samples, $Y_{k+1}$ is a second sample of the two or more interpolation samples, $W_1$ is a first weight of the interpolation weights, and $W_2$ is a second weight of the interpolation weights.

13. The interpolation controller according to claim 12, wherein the non-transitory instructions are further executable to cause the interpolation controller to select the interpolation point to correspond with an offset selected relative to the first and second samples, the offset being represented as $\Delta$.

14. The interpolation controller according to claim 8, wherein the radar system and the interpolation controller are disposed in a vehicle.

15. A system for interpolating a wireless spectrum comprising:
an antenna system operable for transmitting wireless signals and responsively receiving reflected signals; and
an interpolation controller configured for collecting a plurality of reflection radar spectrum samples from the reflected signals, selecting an interpolation point between two or more interpolation samples of the reflection radar spectrum samples, calculating an interpolation weight for the each of the interpolation samples as a combination of weight coefficient providing a minimum mean square error between an interpolated spectrum and an actual spectrum at the interpolation point, and determining the interpolated spectrum at the interpolation point as a summation of a product of the interpolation weights and the interpolation samples.

16. The system according to claim 15, wherein the interpolation controller is further configured to determine the interpolation weights according to a weighting vector, the weighting vector being represented as:

$$w = \text{argmin}_w\{|\hat{y}_{k+\Delta} - y_{k+\Delta}|\},$$

where W is the weighting vector, $\hat{y}_{k+\Delta}$ is the interpolated spectrum, and $Y_{k+\Delta}$ is the actual spectrum.

17. The system according to claim 16, wherein the interpolation controller is further configured to determine the interpolated spectrum according to a spectrum function, the spectrum function being represented as:

$$\hat{y}_{k+\Delta} = w^H y,$$

where $\hat{y}_{k+\Delta}$ is the interpolated spectrum, W is the weighting vector, and y represents the reflected signals.

18. The system according to claim 17, wherein:

$$w = \begin{bmatrix} w_1 \\ w_2 \end{bmatrix};$$

$$y = \begin{bmatrix} y_1 \\ y_2 \end{bmatrix};$$

and wherein $W_1$ is a first weight of the interpolation weights, $W_2$ is a second weight of the interpolation weights, $y_1$ is a first sample of the two or more interpolation samples, and $y_2$ is a second sample of the two or more interpolation samples.

19. The system according to claim 16, wherein the interpolation controller is further configured to determine the interpolated spectrum according to a spectrum function, the spectrum function being represented as:

$$\hat{y}_{k+\Delta} = W_1 Y_{k+1},$$

where $\hat{y}_{k+\Delta}$ is the interpolated spectrum, $Y_k$ is a first sample of the two or more interpolation samples, $Y_{k+\Delta}$ is a second sample of the two or more interpolation samples, $W_1$ is a first weight of the interpolation weights, and $W_2$ is a second weight of the interpolation weights.

20. The system according to claim 16, wherein the antenna system and the interpolation controller are disposed in a vehicle.

* * * * *